F. O. BYNOE.
SUPERHEATER FOR HEATING PURPOSES.
APPLICATION FILED DEC. 8, 1910.
1,027,815.
Patented May 28, 1912.
5 SHEETS—SHEET 2.
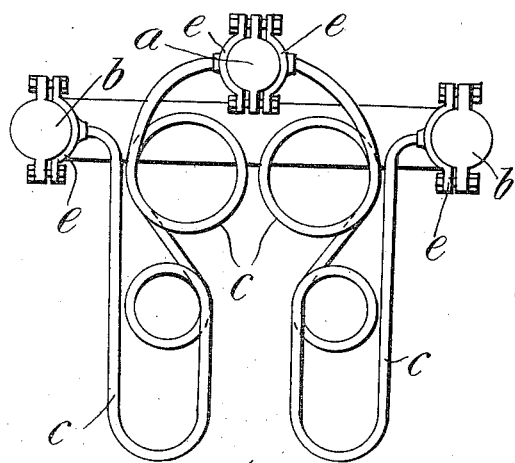
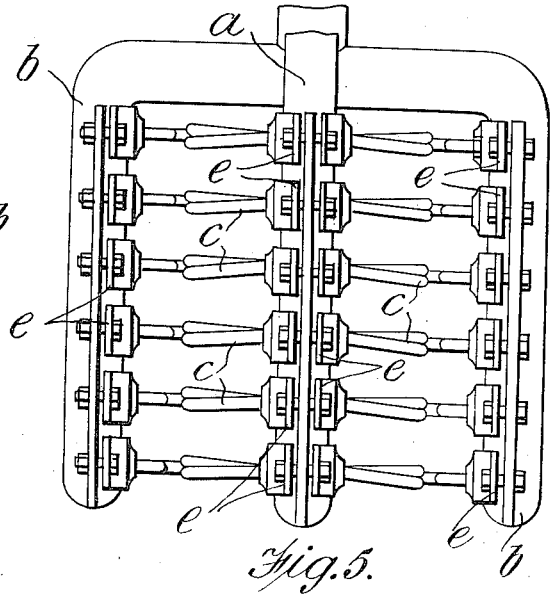
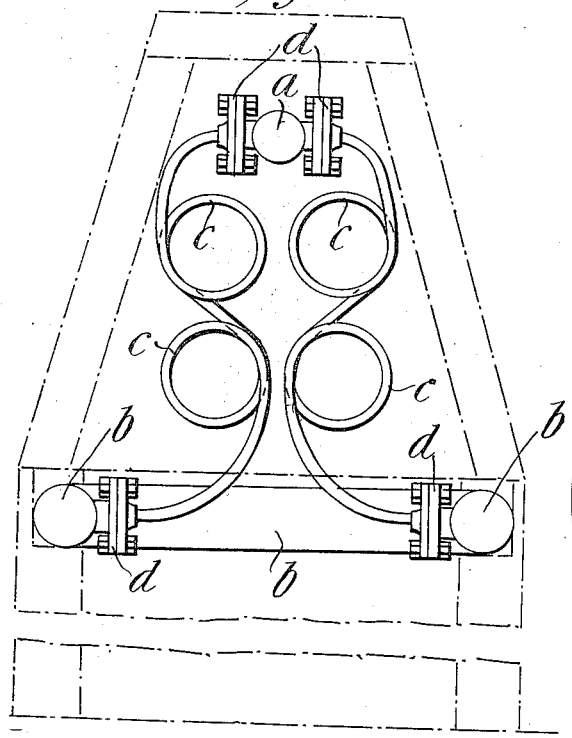
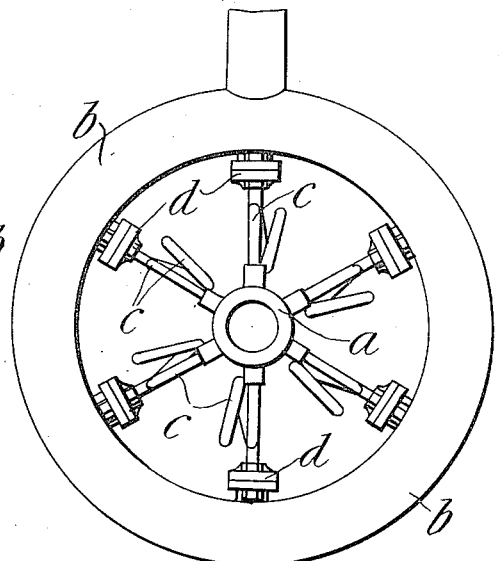
WITNESSES
R. C. Braddock
Emory L. Groff
INVENTOR
FREDERICK OATLEY BYNOE
By
D. T. Wolhaupter
His Attorney

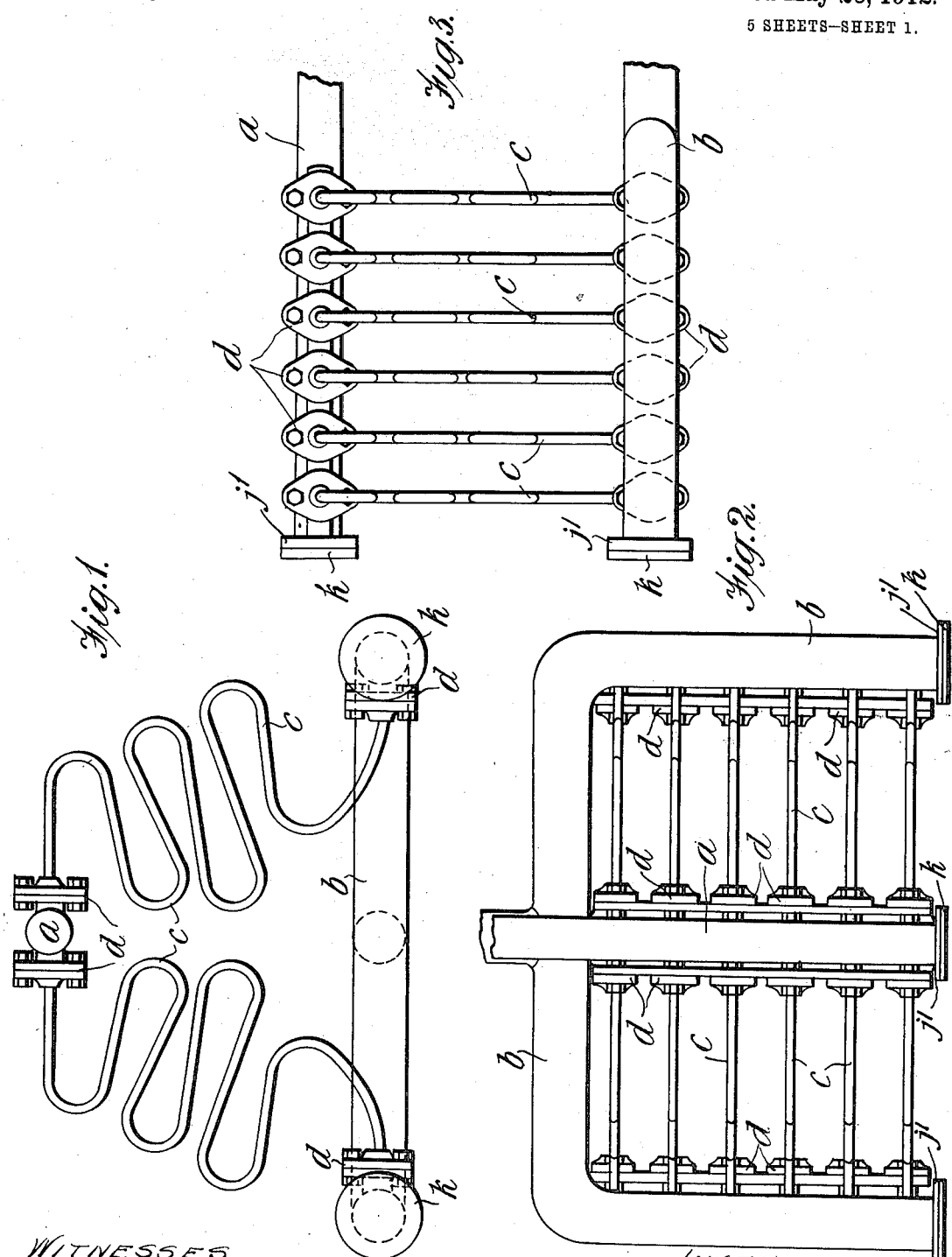

F. O. BYNOE.
SUPERHEATER FOR HEATING PURPOSES.
APPLICATION FILED DEC. 8, 1910.

F. O. BYNOE.
SUPERHEATER FOR HEATING PURPOSES.
APPLICATION FILED DEC. 8, 1910.
1,027,815.
Patented May 28, 1912.
5 SHEETS—SHEET 4.
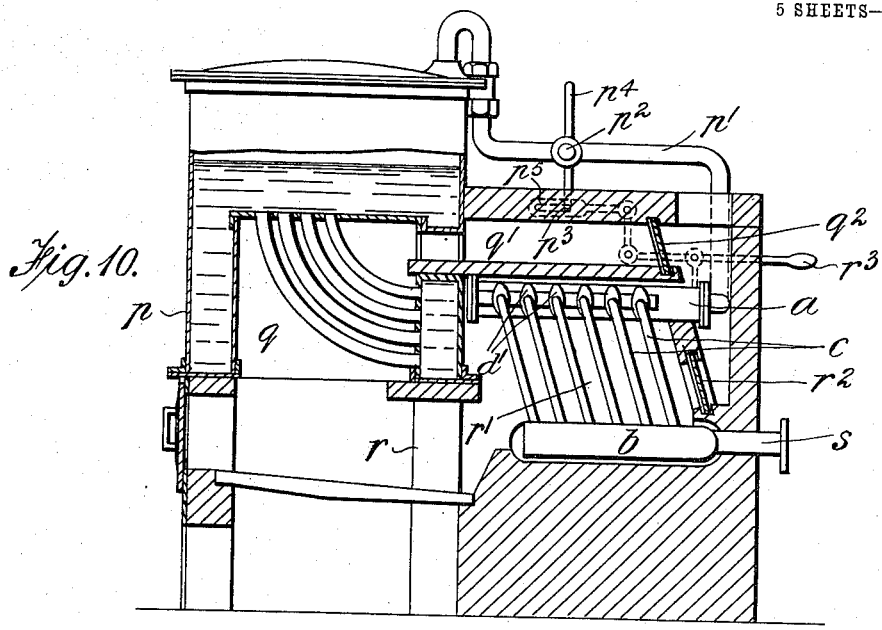
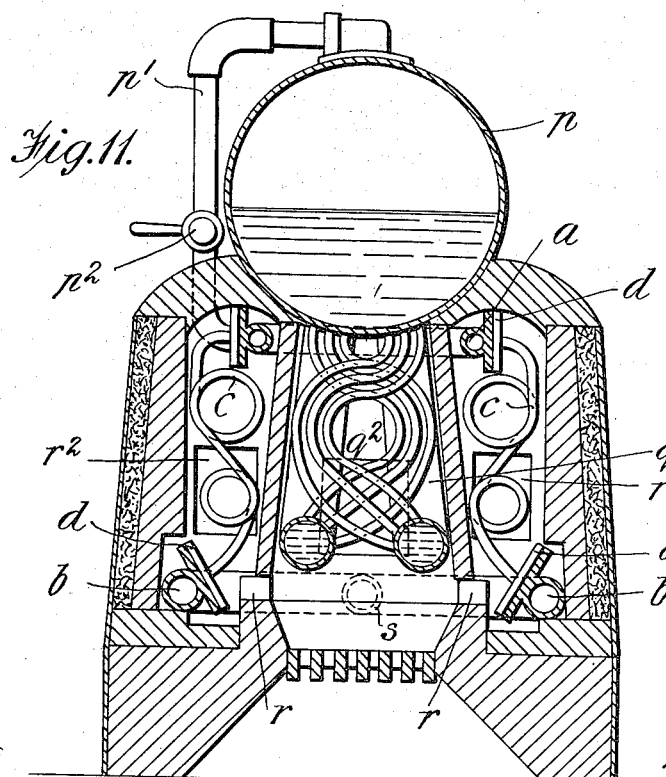

F. O. BYNOE.
SUPERHEATER FOR HEATING PURPOSES.
APPLICATION FILED DEC. 8. 1910.

1,027,815.

Patented May 28, 1912.

5 SHEETS—SHEET 5.

WITNESSES
R. C. Braddock
Emory L. Groff

INVENTOR
FREDERICK OATLEY BYNOE
By
His Attorney.

UNITED STATES PATENT OFFICE.

FREDERICK OATLEY BYNOE, OF ACTON, ENGLAND, ASSIGNOR TO BALCHIN, SCHULZ & COMPANY, LIMITED, OF LONDON, ENGLAND.

SUPERHEATER FOR HEATING PURPOSES.

1,027,815.      Specification of Letters Patent.      Patented May 28, 1912.

Application filed December 8, 1910. Serial No. 596,313.

*To all whom it may concern:*

Be it known that I, FREDERICK OATLEY BYNOE, a subject of the King of Great Britain and Ireland, and resident of Acton, county of Middlesex, England, have invented certain new and useful Improvements in and Relating to Superheaters for Heating Purposes, of which the following is a specification.

The present invention relates to superheaters of the type in which upper and lower headers are connected by bent or curved tubes and in which the saturated steam passes downward toward the hottest part of the furnace where it is superheated, and the object of the present invention is the improved construction and arrangement of superheater whereby superheated steam is produced at its maximum temperature and volume and with the minimum amount of pressure, that is to say, a pressure slightly above the atmospheric pressure, required to give it a forward motion, the steam entering at minimum temperature in the furnace and leaving at maximum, the above being the converse of the requirements of superheaters of which many forms have been in use for the production of superheated steam under high pressure and intended for power purposes only.

Superheaters for heating purposes constructed in accordance with the present invention are designed for use in connection with the supply of superheated steam to radiating coils or heating chambers which terminate or are provided with an outlet open to the atmosphere or to any other chamber or condenser which presents no resistance or back pressure to the passage of superheated steam.

For a clear understanding of the said invention reference is to be had to the following description and accompanying sheets of drawings in which:—

Figure 8:
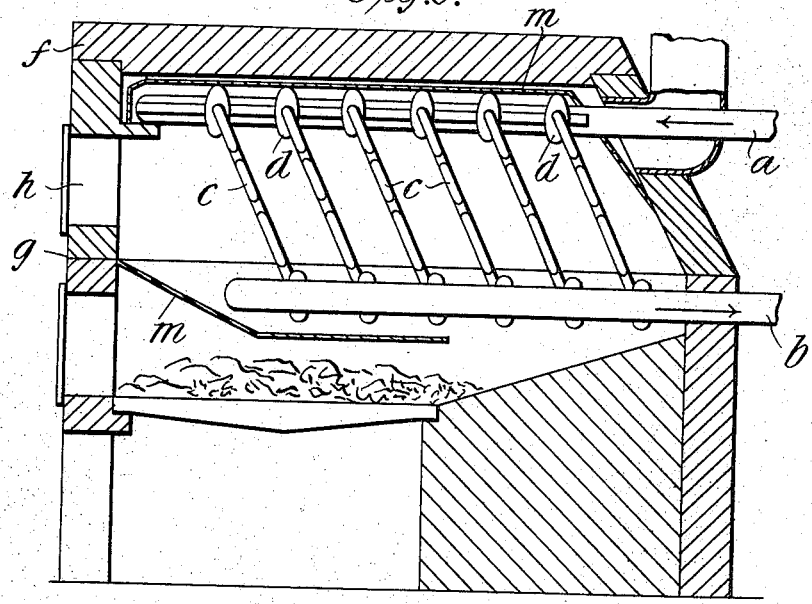
Figure 9:
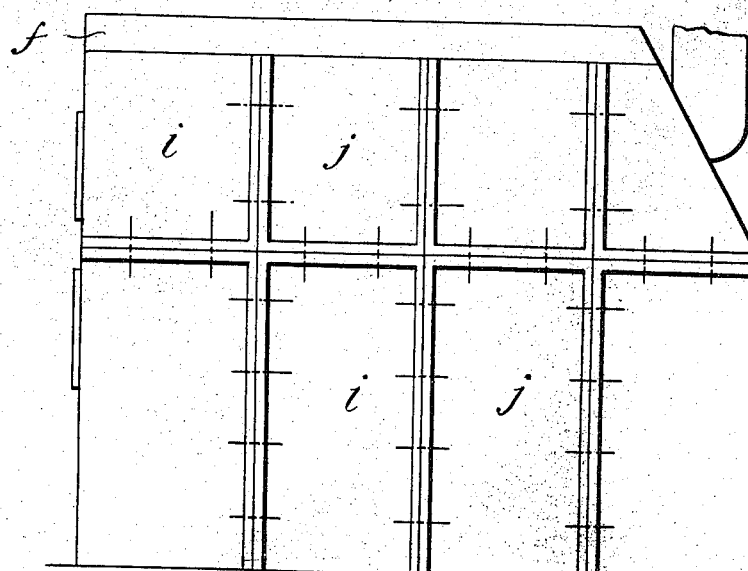

Figures 1 to 3 are respectively an end elevation, a plan and a side elevation of a superheater having its tubes bent or zig-zagged in a vertical plane. Fig. 4 is an end elevation; and, Fig. 5 a plan view, the tubes in this case being bent to form coils and with headers in close proximity. Fig. 6 is an end view of a similar arrangement but with headers well separated. Fig. 7 is a plan view showing the invention as applied to a circular superheater. Fig. 8 is a vertical section through the superheater cover and furnace showing the tubes inclined from front to back; and, Fig. 9 is a side elevation illustrating the sectional casing of the superheater. Figs. 10 and 11 illustrate in vertical section the application of the superheater in combination with the boiler, Fig. 10 showing the superheater located by the side or adjacent to the boiler, and Fig. 11 arranged within and outside the boiler tubes; and, Figs. 12 to 16 are details hereinafter referred to.

Like letters of reference indicate corresponding parts in the several views.

According to the present invention, to produce a large volume of steam without the risk of congestion or blocking, the superheater (which may be of rectangular, circular or other form as will be seen from an inspection of the drawings) consists of inlet headers $a$ and outlet headers $b$ connected by a large number or a series of bent, zig-zagged or coiled tubes $c$ of small bore in order to produce a greater heating surface in relation to the column of steam flowing through the tubes. The headers are so arranged that the steam by flowing in a downward direction—and this is an important feature of the invention—shall be distributed evenly through all the small tubes by the resistance offered by the increased expansion of the steam as it is expanded on entering the portion of the tubes lying in the hottest zone of the gases in the furnace. The combined sectional area of the outlet headers $b$ should be at least—and this is an important fact—three to four times the sectional area of the inlet headers $a$ to allow for the increase of volume produced in the process of superheating.

By using the small-bored superheating tubes $c$ the superheater as a whole, when in use, is not put out of action in the event of a tube $c$ being burned out, inasmuch as there is so little pressure that the escape of steam causes little or no inconvenience.

As the intense heat of the furnace gases produces a most destructive effect upon the superheating tubes it is important that any single tube be easily removed and replaced by another, and for this purpose the tubes, which are preferably made of universal pattern, so that only one form of tube is required for each type of superheater—see Figs. 1, 4 and 6—are connected to the headers (more especially to the outlet headers $b$) by means of flanges $d$—Figs. 1, 6, 7 and 8—or by saddles $e$—Fig. 4—or by means of any other similar joint or connection which can readily and conveniently be disconnected, inasmuch as it is usually impossible to undo any ordinary form of screw-joint after the high temperature superheated steam has passed through the coils for any considerable length of time.

The superheating tubes $c$, for ready accessibility, inspection and cleaning purposes, are arranged in parallel between the inlet and outlet headers, and they are preferably inclined diagonally either forward—as in Fig. 8—or backward according to the direction of the hot gases in order to facilitate the maximum effect of said hot gases according to the baffling given to the furnace gases by the baffles $m$—Fig. 8—on their way to the smoke chimney or shaft. For like purposes also the cover or case inclosing the superheater tubes may be made up of sections—see Fig. 8—so that the top section $f$, or both top section $f$ and middle section $g$, may be removed and a sighting or cleaning aperture $h$ may be provided in any suitable part of the case.

The casing of the furnace and superheater cover are preferably made up of sections $i$ and $j$—see Fig. 9—bolted or otherwise detachably secured together so that the size of the superheater may be increased where additional superheat is required for extension of its use, by the addition lengthwise of more sections, it being understood that the headers $a$ and $b$ are provided as shown with end flanges $j'$ and cover plates $k$.

The inlet headers are arranged in that part of the furnace most distant from the fuel where the gases are coolest—see Fig. 8—and the outlet headers in that part of the furnace where the gases are hottest, thus insuring the superheated steam leaving the superheater where the maximum heat has been absorbed. The effect of the steam descending—and this is an important feature—is that it distributes itself better through all the superheater tubes which are preferably provided with a large number of bends or coils or with a longer length of pipe at the inlet end than at the outlet end in order to produce a longer heating effect and surface where the furnace gases are coolest, this extra bending, coiling or length at the inlet end tending to increase the life of the tubes.

Referring to Figs. 10 and 11 it will be seen that in combining the boiler with the superheater, the respective heating surfaces are arranged in separate and independent chambers lined with fire-resisting material. The arrangement adopted is such that by suitably placed flues and dampers (as hereinafter described) the flow of hot gases from the furnace can be directed through either chamber separately or divided to pass through both at the same time. In this fashion the hot gases can be so regulated or balanced to heat the boiler and superheater in any proportion or degree as required.

In Fig. 10 the superheater is represented by the side or adjacent to the boiler $p$. $q$ is a boiler heating chamber with a flue $q'$ and a controlling damper $q^2$. This chamber is separated from the superheater chamber by the double cylinder walls of the lower part of the boiler except at the opening $r$ below the boiler. The boiler flue is separated from the top of the superheater chamber $r'$ by a firebrick slab or diaphragm. The superheater chamber $r'$ is supplied with the hot gases from the furnace through the opening $r$. It has a flue-controlling damper $r^2$. A steam supply pipe $p'$ from the boiler leads to the superheater inlet pipe and has a stop cock $p^2$. At the back is a superheated steam outlet pipe $s$. To operate the apparatus the superheater damper $r^2$ is closed and the boiler damper $q^2$ opened. The hot gases from the furnace are then conducted between the boiler tubes and out through the flue $q'$ without passing through the superheater chamber and so damaging, by burning, the superheater tubes which have no steam in them. As soon as a sufficient supply of saturated steam has been produced in the boiler, the supply cock $p^2$ is turned on and the damper $r^2$ is opened. A portion of the gases from the furnace then enters the superheater chamber $r'$. The damper $r^2$, or a second master damper, controlling the draft through the superheater may be so arranged and connected by suitable chains or levers with the saturated steam supply cock $p^2$ that the damper is only open when the saturated steam is flowing through the superheater, thus preventing the heating of empty superheater tubes through an oversight on the part of the operator. This forms an important feature of the invention.

In Fig. 10 a pin $p^3$ at the end of the arm $p^4$ runs into a slot $p^5$ which is situated at the end of the rod $r^3$ actuating the damper $r^2$. In the position illustrated in the diagram the damper $r^2$ is closed and the pinion being fixed such damper can only be opened in the event of the cock $p^2$ being turned on. In like manner the cock $p^2$ cannot be closed without closing the damper $r^2$. Said damper $r^2$ can be actuated by the lever $r^3$ and the inlet cock will be always automatically open when the damper is opened.

In the arrangement shown in Fig. 11 the chamber containing the superheater is outside that containing the boiler tubes. The flue and damper at the back of the boiler heating chamber regulates the heating of the boiler and the flue and dampers at the back of the superheater tubes regulate the flow of hot gases through the superheater chamber. The working of this arrangement is the same as for that described and illustrated in Fig. 10. Although not illustrated in the drawings it is obvious that the heating surfaces of the superheater or the boiler may be in either chamber according to requirements.

Figure 12:
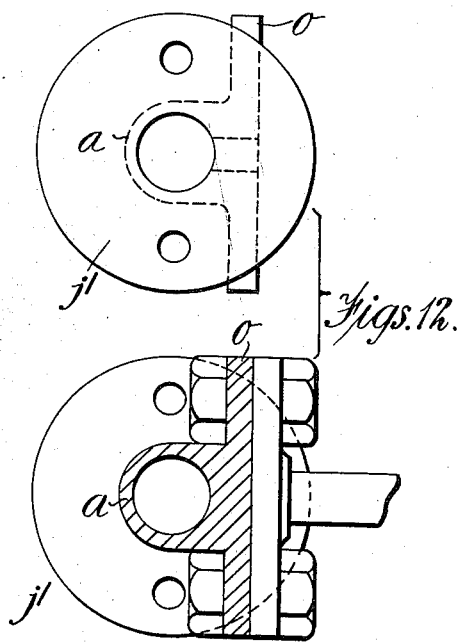
Figure 14:
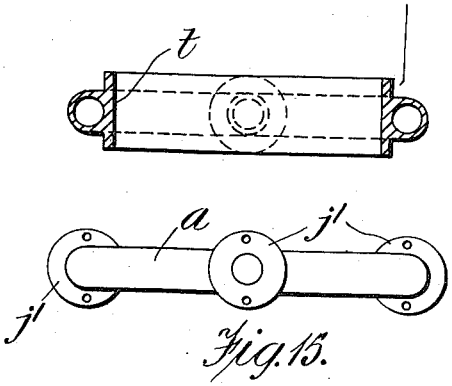
Figure 13:
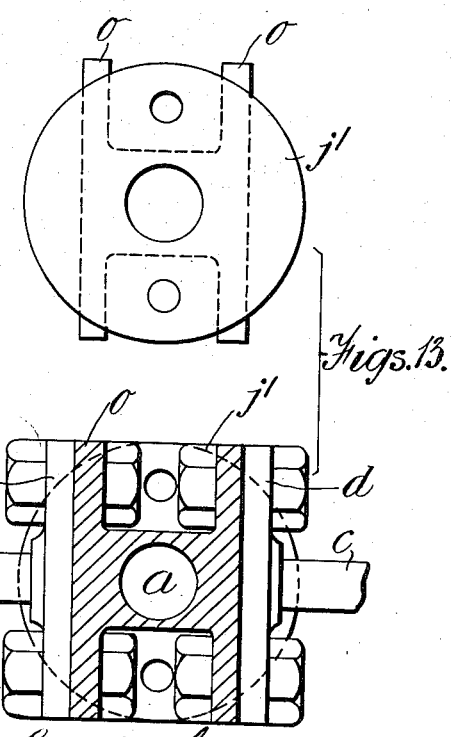
Figure 16:
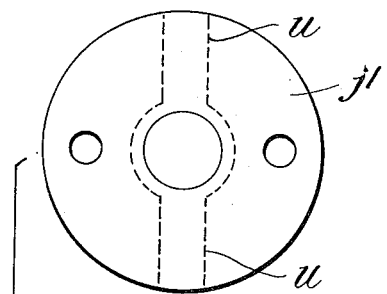
Figure 15:
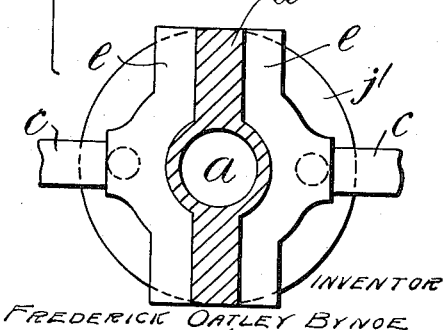

In constructing the superheater according to my invention, I use preferably headears as represented in Figs. 12 to 16. Fig. 12 illustrates two views of a header having a longitudinal tangential flange $o$ and end flanges $j'$. The end flanges are for making up suitable lengths of headers and the longitudinal flanges for connecting to the header the superheater tubes as illustrated in the sectional diagram. Fig. 13 illustrates a similar flanged header to take a series of tubes on either or both sides, the sectional view showing superheater tubes $c$ connected. Fig. 14 shows a plan and a sectional elevation of a concentrically flanged ring header (flange indicated by $t$) for use in constructing round superheaters. Fig. 15 represents an end connecting tube between the side headers of oblong superheaters. Fig. 16 is an illustration of a header with longitudinal radial flanges or ribs $u$, the sectional view showing saddle connections $e$ of the superheater tubes $c$.

Having now described my invention, what I claim as new and desire to protect by Letters Patent of the United States is:—

1. A superheater comprising outlet headers arranged in spaced parallel relation in the bottom portion of a fire box, an inlet header parallel with and centrally disposed relative to the outlet headers and in a higher plane, and restricted tubes projecting laterally from opposite portions of the inlet header and connecting with the outlet headers said tubes having bends arranged in staggered relation.

2. A superheater comprising an inlet header disposed in the cooler portion of a fire box, outlet headers of larger diameter than the inlet header disposed in the hottest portion of a fire box, and tube connections of less diameter than the inlet header and located between the inlet and outlet headers and being provided with bends adjacent the connection with the inlet header.

3. A superheater comprising an inlet header, outlet headers of greater area than the inlet header, and restricted tube connections between the inlet header and the outlet headers.

4. A superheater comprising an inlet header provided with oppositely disposed laterally projecting flanged outlets, a pair of spaced parallel outlet headers of larger diameter than the inlet header and located in a lower plane than the inlet header, said outlet headers being provided with confronting laterally projecting flanged inlets, and of less diameter than the inlet header and tubes having flanged ends that are detachably connected to the flanged inlets and outlets of the inlet and outlet headers.

5. An apparatus for superheating steam, the same comprising a heating chamber, and a circulating system for the steam exposed within the heating chamber, said circulating system including inlet and outlet members, the latter being of greater sectional area than the sectional area of the inlet member, restricted tube connections between the inlet and outlet members, and means for directing the flow of steam downward through the tube connections to permit the same to pass from the apparatus at approximately atmospheric pressure.

In testimony whereof I affix my signature in the presence of two witnesses.

FREDERICK OATLEY BYNOE.

Witnesses:
BENJ. THOS. KING,
ROBT. HUNTER.